United States Patent [19]

Falck

[11] Patent Number: 5,227,779
[45] Date of Patent: Jul. 13, 1993

[54] CODABLE ELECTRONIC DEVICES

[75] Inventor: John B. Falck, Braintree, United Kingdom

[73] Assignee: Cotag International Limited, Cambridge, England

[21] Appl. No.: 697,733

[22] Filed: May 3, 1991

Related U.S. Application Data

[63] Continuation of Ser. No. 491,054, Mar. 9, 1990, abandoned.

[30] Foreign Application Priority Data

Mar. 9, 1989 [GB] United Kingdom ............ 8905440

[51] Int. Cl.$^5$ ............................................. H04B 7/00
[52] U.S. Cl. ........................ 340/825.54; 340/825.63; 340/825.64
[58] Field of Search ............... 340/825.54, 825.63, 340/825.64, 539; 455/38.1, 41, 227, 228; 370/8, 9

[56] References Cited

U.S. PATENT DOCUMENTS

| | | | |
|---|---|---|---|
| 3,727,142 | 4/1973 | Di Sipio et al. | 340/825.63 |
| 4,189,713 | 2/1980 | Duffy | 340/825.63 |
| 4,486,752 | 12/1984 | Chihak | 340/825.63 |
| 4,514,731 | 4/1985 | Falck et al. | 340/825.54 |

FOREIGN PATENT DOCUMENTS

0289136 11/1988 European Pat. Off. .

*Primary Examiner*—Donald J. Yusko
*Assistant Examiner*—Dervis Magistre
*Attorney, Agent, or Firm*—Cushman, Darby & Cushman

[57] ABSTRACT

Pulses of a carrier signal supplied to an input circuit of a codable electronic device, e.g. a transponder tag, are divided by a chain to provide a logic signal, the value of which depends on the length of the pulse, the logic signal only being entered into a data store upon termination of the pulse. The logic signal is entered by a reset signal from output of the input circuit.

14 Claims, 4 Drawing Sheets

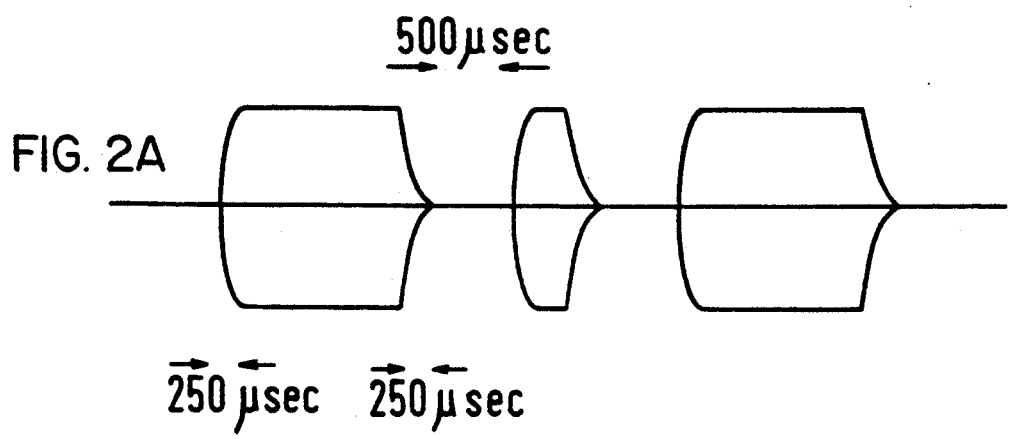
FIG. 2A
FIG. 2B
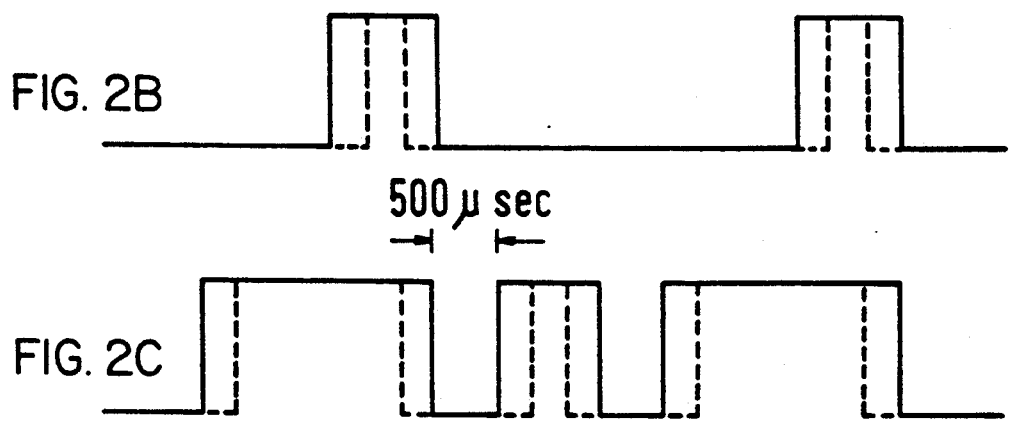
FIG. 2C
DATA CLOCKED     1     0     1

CODABLE ELECTRONIC DEVICES

This is a continuation of application Ser. No. 07/491,054, filed on Mar. 9, 1990, which was abandoned.

BACKGROUND OF THE INVENTION

The present invention relates to transponder devices, and more particularly to transponder devices or tags which can be programmed and which, when interrogated, provide a response in accordance with the program. The programming of the tag may involve the entry of data into a memory or may modify the mode of operation of the tag.

At present there are two commonly-used techniques for remotely entering data into tags. The first is to use a carrier signal as a reference clock to control internal circuitry within the tag. A second signal at a different frequency is then used to write or enter the data. Such arrangements are disclosed in U.S. Pat. No. 4,399,437 and U.S. Pat. No. 4,514,731. The alternative approach is to superimpose the data on the carrier by means of either phase or amplitude modulation. Where phase modulation is used, the carrier frequently is the means by which an internal reference oscillator within the tag is activated.

Both approaches have their limitations. With two separate input signals, it is necessary to incorporate two analogue input circuits and two input aerials. This both increases the cost of the tag and also the internal current requirements. In addition it involves a further burden of complexity on the control unit.

The use of a phase modulated approach with a single carrier requires that the system determines the sense of the aerials in the tag prior to writing any data. It also requires that the aerial orientation of the tag remains constant with respect to the aerials at the control equipment during the write phase. This involves a certain level of cost in additional circuitry and may impose some system limitations on its use.

Amplitude modulation overcomes the problem of orientation but suffers from limitations in dynamic range. For low frequency systems where the field strength decays in accordance with the inverse cube of range, adequate automatic gain control must be included within the input amplifier of the tag. This represents a difficult technical challenge and invariably limits the dynamic range which practically can be achieved.

EP-A-0289136 discloses a data transmission system in which the output of a controller resonant circuit is pulsed to change the logic level of a data signal read into the memory of a tag. However, clocking is determined according to a data transmission protocol, so the tag must have an internal timing circuit. Where appropriate, a new data bit is generated without a change in the output of the controller resonant circuit.

SUMMARY OF THE INVENTION

The present invention seeks to provide read and write techniques capable of operating over a wide dynamic range which have neither the cost penalties of the double aerial input approach nor the system complexities associated with phase or amplitude modulation.

According to a first aspect of the present invention there is provided a codable electronic device comprising input circuitry and data storage means, said input circuitry being arranged to receive pulses of a carrier signal, and said device comprising means for providing a logic signal having alternate logic values in response to said pulses, wherein the logic value of said logic signal is dependent upon the length of a respective incoming carrier pulse, and wherein means are provided for preventing said logic value being supplied to said data storage means until termination of said pulse.

According to a second aspect of the present invention there is provided a method of imparting data to storage means of a codable electronic device, comprising supplying pulses of a carrier signal to an input of said device, each said pulse having a controlled length, wherein the length of said pulse determines the value of a single respective data bit, and/or the termination of each said pulse causes said data bit to be entered into said storage means.

BRIEF DESCRIPTION OF THE DRAWINGS

Preferred embodiments of the present invention will now be described, by way of example only, with reference to the accompanying drawings, of which:

FIGS. 2A–2C are signal diagrams relating to FIG. 1;

DESCRIPTION OF THE PREFERRED EMBODIMENT

Figure 1:
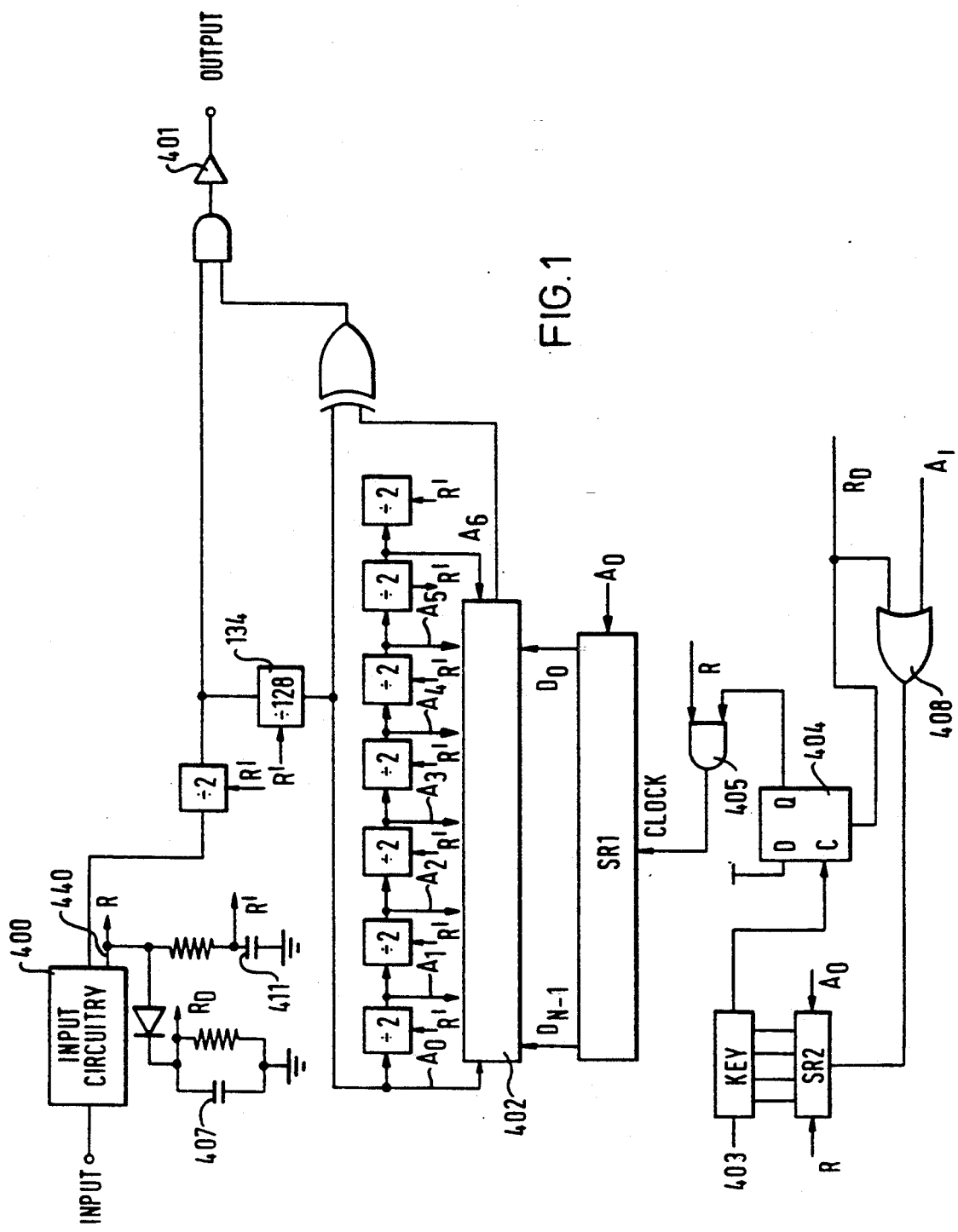
FIG. 1 shows a block diagram of a transponder circuit in accordance with a first embodiment of the present invention.

Basically the present invention provides a codable electronic device comprising input circuitry and data storage means, the input circuitry being arranged to receive pulses of a carrier signal and comprising means for providing a logic signal in response to the pulses, characterized in that the logic value of the logic signal is dependent upon the length of a respective incoming carrier pulse, and in that means are provided for preventing said logic value being supplied to the data storage means until termination of said pulse.

An advantage of the above device is that the tag does not require internal timing means. The clocking of the data is effected solely by termination of the carrier pulses. This saves space, material and expense.

In a preferred device the data storage means comprises a main memory of the device, the means providing the logic signal thereto is a divider chain, and the preventing means is a reset output of the input circuitry, the reset output being connected to a memory input which clocks data into the memory. An advantage of this arrangement is that the preventing means comprise an output of the input circuitry which is already present in the device; thus no additional components are necessary. Alternatively or in addition the data storage means may comprise means for changing the functioning of the device. The content of the functioning changing means may be compared with a key which, upon the occurrence of matching, actuates means to permit data to be clocked into the main memory.

In a preferred arrangement, upon the occurrence of matching, the key enables a latch circuit which opens an AND-gate to pass signals from the reset output to the clock input of the main memory, the device further comprising means for producing a delayed reset signal if the time between successive carrier pulses exceeds a predetermined maximum value which resets the functioning changing means and the latch circuit, and means for resetting the functioning changing means if the duration of a carrier pulse exceeds a predetermined maximum value. An advantage of this arrangement is that the possibility is reduced of any random noise or unauthorised source interfering with the correct operation of the device.

A problem with existing tags is that they can interact in undesired ways with the control units of other tag systems. For example, electronic article surveillance (EAS) systems are in widespread use as anti-shoplifting systems, and the bearer of a coded tag for another system can inadvertently trigger the shop alarm with embarrassing results. The present invention also seeks to overcome this problem.

Accordingly, in another preferred arrangement the content of the functioning changing means is compared with a key which, upon the occurrence of matching, actuates means to permit the device to respond to a respective interrogation pulse transmitted thereto. This has the advantage that a number of different sets of coded devices may be used in a single building; devices in each set will only respond to interrogation pulses which are preceded by a signal corresponding to their respective key.

The present invention also provides a method of imparting data to storage means of a codable electronic device, comprising supplying pulses of a carrier signal to an input of the device, each pulse having a controlled length, characterized in that the length of the pulse determines the value of a single respective data bit, and/or in that the termination of each pulse causes the data bit to be entered into the storage means.

The electronic device is preferably a transponder device such as an electronic tag and the data can constitute an actuating instruction, allowing the tag to transmit and/or receive further information.

In a preferred method, the duration of the pulse determines the value, "1" or "0", set up at a particular point within the electronic device, and the termination of the pulse causes said value to be entered into a shift register or a memory within the device.

The circuit shown in FIG. 1 has certain similarities with that disclosed in U.S. Pat. No. 4,514,731.

The circuit comprises a 132 KHz input amplifier 400 and an amplitude modulated output driver 401 at 66 KHz. A divide-by-128 counter chain 134 is used to derive the essential internal timing functions. The data within the tag is accessed by means of the data selector 402 from the N bit shift register SR1. A second shift register SR2 comprising one or more stages provides a means by which the transponder may be switched to a write condition or mode. The state of the shift register SR2 is compared with a preset key 403. If a match exists between the shift register SR2 and the key 403 then a write latch 404 is enabled. The output of the write latch provides a first input to an AND gate 405. The second input to the AND gate is the reset R derived from output 440 of the input circuitry 400 and having a typical recovery time of 250$\mu$ sec. The output from AND gate 405 forms the clock input to the main shift register SR1. A second reset circuit 407 with a recovery time of approximately 2 m sec is also derived from the first reset R. The output $R_D$ from the second reset 407 is the reset input to the write latch 404. It is also, via OR gate 408, a reset to shift register SR2. It should be noted that $R_D$ does not cause a reset automatically when R resets. $R_D$ will only cause a reset if the next pulse arrives at an interval in excess of 2 msec of R resetting. The second input to the OR gate 408 is derived from the $A_1$ output of the counter chain. The $A_O$ output in the counter chain is the data input to both shift registers SR1 and SR2. The reset line to the divider chain 134 is delayed for approximately 1–5 micro sec by a delay circuit 411.

Operation of the circuit during a typical programming or write sequence will now be described. In order to put the circuit into a condition in which it will accept data, it is necessary first to transmit a predefined "key" signal. This prerequisite ensures protection of the internal memory against either unauthorised programming or data corruption from any sporadic high level noise sources. The key is entered by transmitting a predetermined train of pulses to the tag.

As soon as the circuit detects the first pulse in the train both reset circuits 400 and 407 are lifted. The divider chain 134 is then clocked at a rate determined by the frequency of the input signal. The state of the Ao input to both shift registers at any instant is a function of the number of cycles within the input pulse. Thus for an input signal at 132 KHz for a duration of 1.5 m sec, the $A_O$ input to the shift register will be data 1. If the input signal is terminated after 1.5 m sec the change in state of the reset circuit 400 will clock the data into the shift register SR2. It will be appreciated that R and $A_O$ are respectively the clock and data inputs into shift register SR2. Similarly a transmit pulse of 0.5 m sec duration will clock a data 0 into shift register SR2. Any possible glitches which might corrupt the data input to the shift register SR2 are avoided by means of the delay circuit 411. This ensures that the divider chain 134 is not reset until after the data has been clocked into the shift register SR2. By sending a sequence of pulses of the appropriate duration it is thereby possible to enter the correct key into the shift register SR2.

Any data written into the shift register SR2 is held subject to two conditions. The first of these is that the data is reset if the period between successive pulses exceeds 2 msec. If this happens, $R_D$ resets shift register SR2 and the write latch 404. The second condition is that no pulse should exceed a duration of 2 msec. If this happens, $A_1$ switches to value "1" which, via OR gate 408, resets shift register SR2. These requirements significantly reduce the possibility of any random noise being clocked to the shift register SR2.

If the data written into the shift register SR2 matches the key 403 the write latch 404 is enabled at input C. This permits reset signal R, which is supplied to AND gate 405, to clock the data to the memory in the main shift register SR1.

Data can now be written into the main shift register SR1 by means of the same technique as used to write into the shift register SR2. Once data entry to the main shift register SR1 is complete, the write latch 404 is reset by the change in state of $R_D$ on termination of the pulse train.

In practice there is a finite rise and fall time for the transmit signal from the control unit. The exact instant at which a tag will turn on will thus be a function of both its own response and of the range of the tag from the transmit aerial. Similarly there is a production tolerance between between tags for the recovery time of the reset circuits. These factors place a practical limit on the rate at which data may be written. This is illustrated by the waveforms in FIG. 2.

Trace A shows a typical waveform for a pulse train transmitted at 132 KHz by a controller. The rise and fall times of the transmit envelope are of the order of 250$\mu$ sec. Trace B shows the $A_O$ output from the counter chain which forms the data input to shift registers SR1 and SR2. The solid line shows the $A_O$ response when the tag is at close range. When the tag is at its maximum operational range, the $A_O$ response is given by the broken line. It can be clearly seen that the limiting condition occurs at maximum range when the divider chain 134 will commence clocking 250$\mu$ sec after the commencement of the transmit pulse. This corresponds to the instant when the transmit envelope has reached its peak value.

Trace C shows the response of the reset line R. The reset line will lift within just one or two cycles of the 132 KHz input signal. However, the time for the reset line to set at the end of a pulse is much longer and is subject to wide tolerances. Provided there is sufficient time between pulses to allow the reset line to recover to its rest condition this is not a concern. A worst case reset recovery time of 500$\mu$ sec is shown on the trace. As soon as the 132 KHz input signal stops, the $A_O$ input to both shift registers can no longer be clocked and is therefore fixed. It will simply remain in this state until the reset line R sets at which point the data is clocked into either of the shift registers. The small delay of say 1–5$\mu$ sec provided by the time delay circuit 411 ensures that the data from the $A_O$ output is clocked into the shift registers before the counter chain is reset.

The transponder can accept data typically at a rate of 1.5 m sec per data bit. By the nature of its operation it has a write range which essentially is the same as its read range. This is by way of contrast with many other techniques where the write range is frequently significantly less than the read range. It relies solely on a single input amplifier and thereby:

(i) Reduces the quiescent current requirement;
(ii) eliminates the need either to deal with a second input signal at a different frequency or to provide an internal oscillator; and
(iii) greatly simplifies the internal complexity of the custom chip and of the control unit.

Furthermore by writing to the transponder by means of a series of pulses there is no need for any complex AGC circuits within the custom chip as would be required for an amplitude modulated carrier. Also a pulse modulated approach does not suffer from any problems of orientation between tag and controller as is experienced with a phase modulated system.

There is thus provided a cheap and simple way of programming data into a transponder whereby the duration of any input pulse of less than a maximum defined period establishes the state of the data bit to be entered and termination of the pulse is the means by which the data bit is clocked into an internal memory within the transponder. Programming is authorized and effected by means of a train of pulses from a single carrier.

In a modification the reset input to latch 404 is taken from the output of OR gate 408 in which case prolonged transmission will also terminate the entry of data into shift register SR1.

In another modification the key 403 is configured in software and an initial data input to the transponder sets up the key. This is an example of how the parameters of a tag can be set up in software.

If desired the circuitry below the shift register SR1 can be omitted, in which case SR1 is clocked directly by the reset R from output 440.

Although the circuit described above shows data being stored in a single shift register SR1, in practice the tag may have a much larger memory. In these circumstances the shift register SRI would act in the capacity of an intermediate store. It would most usually be subdivided into three fields comprising address, instruction and data. The data would be transferred from the shift register SR1 to the correct address within the main memory on decoding a write instruction from the controller.

Figure 3:
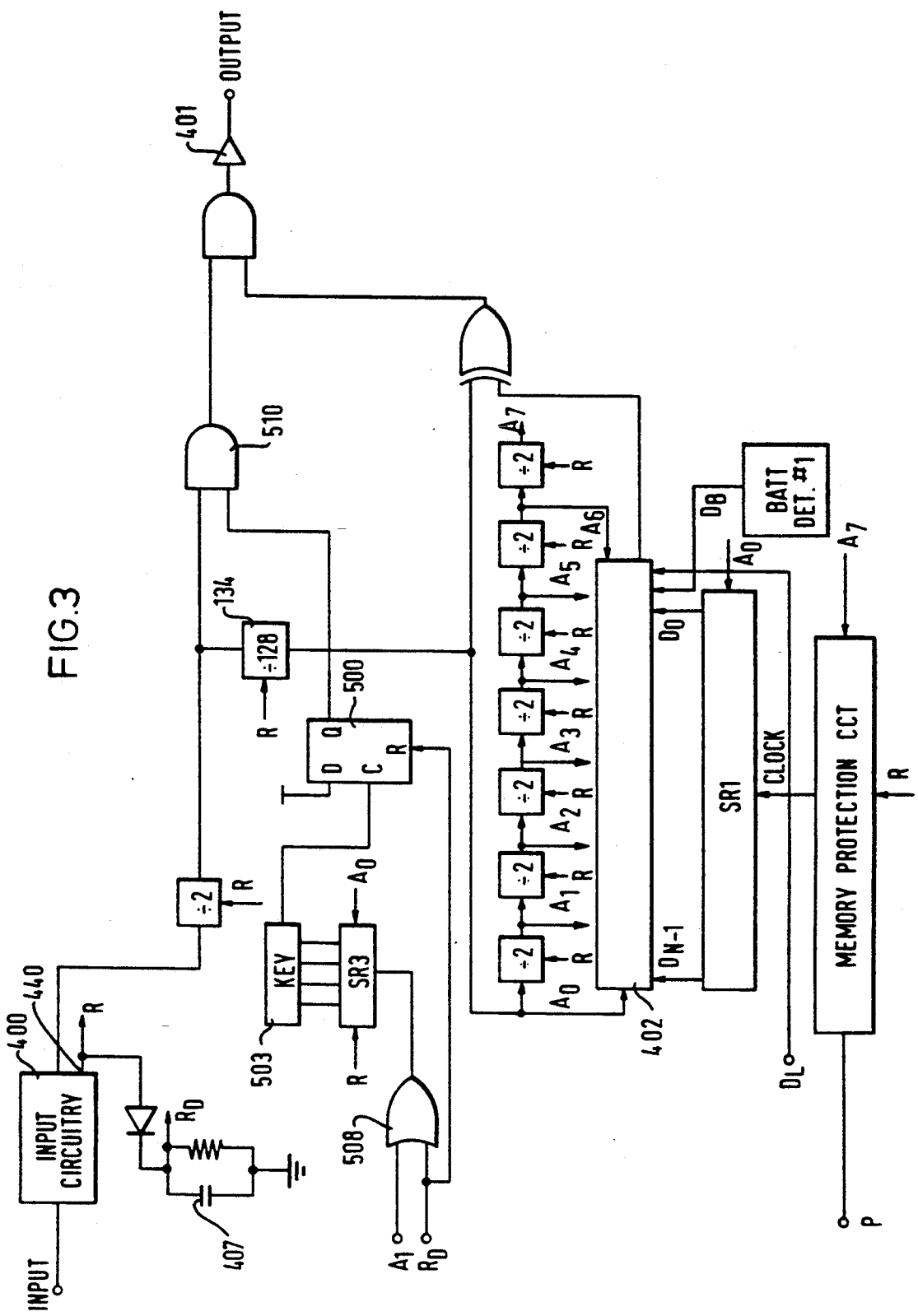
FIGS. 3 and 4 show block diagrams of transponder circuits in accordance with second and third embodiments of the present invention, the bottom part of the embodiment of FIG. 4 having been omitted since it corresponds to that of FIG. 3.

FIG. 3 shows a second embodiment of the present invention which also has similarities with that disclosed in U.S. Pat. No. 4,514,731. In this embodiment, however, the transfer of data by pulse train encoding is used to control the operating characteristics of a tag. This may be of value for example where within the same building it may be desirable to have two families of tags. One family might be attached to individual high value goods for asset tracking purposes The second family of tags might be used for access control. Without any form of discrimination between the families, a person with an access card who was carrying a tagged asset could not be read, and the article would not be identified.

By assigning a different key signal to each family of tags, they can each be turned on selectively. One way by which this can be achieved is with the circuit shown in FIG. 3.

In FIG. 3, an extra AND gate 510 is inserted in the line from the input to the output of the tag. A second input of the AND gate receives a signal from the Q output of a latch 500. The latch is controlled in a manner similar to latch 404 above by a circuit comprising an OR gate 508, a shift register SR3 and a key circuit 503. OR gate 508 receives as inputs $A_1$ from the divider circuitry and delayed reset signal $R_D$ from circuit 407. The output of OR gate 508 constitutes the reset input of shift register SR3 which receives reset signal R from output 440 of input circuit 400 as its clock pulse, and divider output $A_O$ as its data input.

Under normal circumstances the tag is unable to output any data since it is inhibited by the control latch 500. However, on receipt of a pulse train which comprises the correct key as detected by circuit 503, the control latch 500 is lifted. If the pulse train is followed immediately by an interrogation pulse, i.e. before a reset signal $R_D$ occurs, the tag will output the data held in its shift register SR1 in the normal way.

A particularly advantageous application of the above arrangement arises where a simple detection system used in electronic article surveillance (EAS) may activate a coded tag. If the coded tag responds with a signal at the same frequency as the EAS tag, the EAS control unit will give a false alarm. This very undesirable effect can be eliminated by requiring that in order for a coded tag to respond to an interrogation signal, the signal must be preceded by a predetermined key signal, as in FIG. 3.

An even simpler inhibit circuit can be provided for this purpose as will now be described with reference to FIGS. 4 and 5. In this embodiment the reset R from output 440 of input circuitry 400 is connected to the clock input $C_{(A)}$ of a data storage means comprising an A-flip-flop 520, to the set input S of B-flip-flop 530 and via a diode 515 to the reset input $R_{(A)}$ of flip-flop 520. An output $Q_{(A)}$ of flip-flop 520 is supplied to the second input of AND-gate 510. In this embodiment, the rest state of reset output R is shown as high rather than low as in the embodiments of FIGS. 1 and 3.

The clock input $C_{(B)}$ of flip-flop 530 is an output X from counter chain 134 which has a period of 5.82 msec. The data input $D_{(B)}$ of flip-flop 530 is held at zero and the output $Q_{(B)}$ is supplied as the data input $D_{(A)}$ of flip-flop 520. An RC circuit 560 is connected to reset input $R_{(A)}$ so that when R goes low, $R_A$ goes low simultaneously because of diode 515, but when R goes high again, the voltage at $R_{(A)}$ rises only gradually as determined by the RC time constant of circuit 560.

The functioning of the circuit of FIG. 4 will now be described with reference to FIG. 5 in which:

Trace A shows a main interrogation pulse I preceded by a short carrier pulse P;

Trace B shows the resulting course of the reset signal R from output 440;

Trace C shows the corresponding course of the voltage at the reset input $R_{(A)}$ of flip-flop 520; and Trace D shows the output $Q_{(A)}$ of flip-flop 520 supplied to AND-gate 510.

In the rest condition reset R is high and the output $Q_{(A)}$ from flip-flop 520 is low which inhibits operation of AND gate 510. S, $Q_{(B)}$ and $D_{(A)}$ are all high. The subsequent presence of a 132 khz carrier signal P at input 400 causes R to go low (see trace B in FIG. 5) which removes the reset signals from inputs $R_{(A)}$ and S. Upon termination of the carrier signal pulse, reset R goes high which clocks the current value of $D_{(A)}$ as the output $Q_{(A)}$ supplied to AND-gate 510. There are two alternatives.

The first case is when the carrier pulse is shorter than 2.91 msec i.e. half the period of X. In this case the clock input $C_{(B)}$ remains low and thus $Q_{(B)}$ remains high and thus a high signal is supplied to AND-gate 510 to enable the transponder to respond to a subsequent main interrogation signal I.

The second case is when the carrier pulse signal P is longer than 2.91 msec. Here X goes high after 2.91 msec so that $Q_{(B)}$ is clocked low, and thus on termination of the carrier pulse P a low signal continues to be supplied to AND-gate 510, inhibiting response by the transponder. Thus it can be seen that the logic value $Q_{(B)}$ is dependent upon the length of an incoming carrier pulse.

Figure 4:
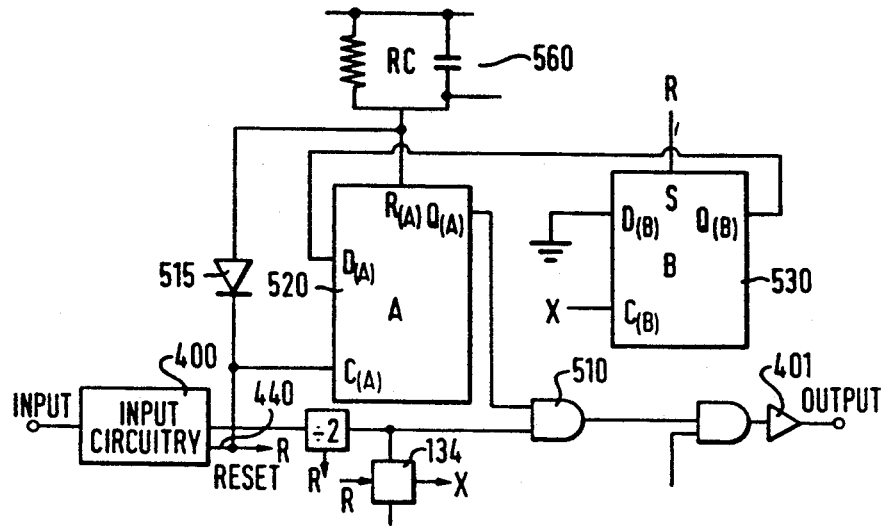
Figure 5A:
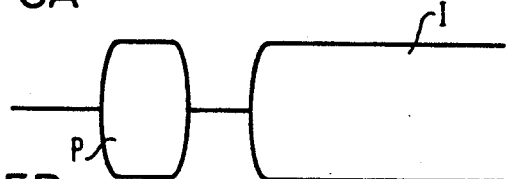
FIGS. 5A–5D are signal diagrams relating to FIG. 4.
Figure 5B:
Figure 5C:
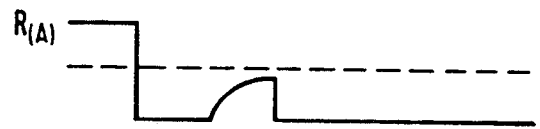
Figure 5D:

The circuit of FIG. 4 effects a further check on the validity of the interrogation signal in that, unless the main interrogation pulse I follows the initial pulse P within a period defined by the reset time of the RC circuit 560, $R_{(A)}$ rises to reset flip-flop 520.

The tag system of FIG. 1 can be combined as appropriate with the tag system of FIG. 3 or FIG. 4, and all the tag systems may incorporate one or more of the features disclosed in U.S. Pat. No. 4,514,731.

Although the invention has been described in relation to transponder devices, it can also be used in connection with one-way devices such as simple data-storing devices and beacons.

It will be understood that the above description of the present invention is susceptible to various modifications, changes and adaptations.

What is claimed is:

1. A codable device comprising:
   input circuitry and data storage means having a data input,
   said input circuitry being arranged to receive discontinuous pulses of a carrier signal, and
   said device comprising divider or counter circuit means connected to receive the carrier signal from said input circuitry and having an output line supplying to said data input of said data storage means a data signal having alternating logic values in response to said carrier signal pulses, wherein the logic value of said data signal alternates in time in dependence upon the length of a respective incoming carrier signal pulse received by said input circuitry, and
   data entry means for producing entry of said logic value into said data input of said data storage means in response to termination of said respective carrier signal.

2. A device according to claim 1, wherein said data storage means comprises a main memory having a clock input, said clock input being arranged to clock data into said main memory, said means supplying the logic signal thereto comprises a divider chain, and said data entry means is a reset output of said input circuitry, said output being connected to said clock input.

3. A device according to claim 1, wherein said data storage means comprises means for changing the functioning of said device, and has a clock input, said clock input being arranged to clock data into said data storage means, wherein said means supplying the logic signal thereto comprises a divider chain, and wherein said data entry means is a reset output of said input circuitry, said output being connected to said clock input.

4. A device according to claim 1 comprising at least first and second data storage means, wherein said first data storage means comprises a main memory having a clock input, said main memory clock input being arranged to clock data into said main memory, and said data entry means is a reset output of said input circuitry, said reset output being connected to said main memory clock input, and wherein said second data storage means comprises means for changing the functioning of said device, and has a clock input, said functioning changing means clock input being arranged to clock data into said second data storage means, said reset output being connected to said functioning changing means clock input, and wherein said second data storage means has a data content, said data content being compared with a key value, whereby said key value, upon the occurrence of matching, actuates means to permit data to be clocked into said main memory.

5. A device according to claim 4, wherein, upon the occurrence of matching, said key value enables a latch circuit, said latch circuit opening an AND-gate to pass signals from said reset output to said functioning changing means clock input, said device further comprising means for producing a delayed reset signal if the time between successive carrier pulses exceeds a predetermined maximum value, said delayed reset signal being arranged to reset said functioning changing means and said latch circuit, and means for resetting said functioning changing means if the duration of a carrier pulse exceeds a predetermined maximum value.

6. A device according to claim 1 comprising at least first and second data storage means, wherein said first data storage means comprises a main memory having a clock input, said main memory clock input being arranged to clock data into said main memory, and said data entry means is a reset output of said input circuitry, said reset output being connected to said main memory clock input, and wherein said second data storage means comprises means for changing the functioning of said device, and has a clock input, said functioning changing means clock input being arranged to clock data to said second data storage means, said reset output being connected to said functioning changing means clock input, and wherein said second data storage means has a data content, said data content being compared with a key value, whereby said key value, upon the occurrence of matching, actuates means to permit said device to respond to a respective interrogation pulse transmitted thereto.

7. A device according to claim 6, wherein, upon the occurrence of matching, said key value enables a latch circuit, said latch circuit opening an AND-gate to pass signals from said input circuitry to a device output.

8. A device according to claim 3, wherein said data storage means comprises a first flip-flop, wherein said means providing the logic signal thereto comprises a second flip-flip, said second flip-flip receiving, as a clock input thereto a signal from said divider chain, and wherein, upon receipt of a carrier pulse having a satisfactory length, said first flip-flop actuates means to permit said device to respond to an interrogation pulse transmitted thereto.

9. A device according to claim 8 wherein said first flip-flop a resetting signal a predetermined period after the termination of a carrier pulse unless it is followed, within said period, by an interrogation pulse.

10. A device according to claim 1 further comprising at least one reset circuit connected to said circuitry, said reset circuit producing a reset signal upon termination of a said carrier signal pulse, and said reset circuit being connected to a clocking input of said data storage means, whereby termination of a said carrier signal pulse causes said logic value to be supplies to said data storage means.

11. A codable electronic device comprising input circuitry and at least first and second data storage means said input circuitry being arranged to receive pulses of a carrier signal, and said device comprising divider or counter circuit means connected to receive the carrier signal from said input circuitry, said divider or counter circuit means having an output line supplying to said data storage means a data signal having alternating logic values in response to said carrier signal pulses, wherein the logic value of said data signal alternates in time in dependence upon the length of a respective incoming carrier signal pulse received by said input circuitry, said input circuitry having a reset output, wherein said first data storage means comprises a main memory having a clock input, said main memory clock input being arranged to clock data into said main memory, said reset output being connected to a first input of an AND logic gate, said AND logic gate having an output connected to said main memory clock input, and wherein said second data storage means comprises means for changing the functioning of said device, and has a clock input, said functioning changing means clock input being arranged to clock data into said second data storage means, said reset output being connected to said functioning changing means clock input, and wherein said second data storage means has a data content, said data content being compared with a key value, whereby said key value, upon the occurrence of matching, actuates a latch, said latch when actuated supplying an enabling signal to a second input of said AND logic gate, to permit data to be clocked by said reset output into said main memory, said device further comprising delay means connected to said reset output, said delay means providing a delayed reset signal, said delayed reset signal being connected to a reset input of said latch and to a first input of an OR logic gate, a further logic signal from said divider chain being connected to a second input of said OR logic gate, and said OR logic gate having an output connected to a reset input of said second data storage means.

12. A codable electronic device comprising:
input circuitry,
a main memory and data storage means,
said device being arranged to receive an interrogation signal and to emit in response thereto a signal relating to the content of the main memory,
said input circuitry being arranged to receive pulses of a carrier signal, and
said device comprising divider or counter circuit means connected to receive the carrier signal from said input circuitry and having an output line supplying to said data storage means a data signal having alternating logic values in response to said carrier signal pulses, wherein the logic value of said data signal alternates in time in dependence upon the length of a respective incoming carrier signal pulse received by said input circuitry,
said input circuitry having a reset output,
said data storage means comprising means for determining whether or not a response is given to an interrogation signal in dependence upon whether or not the interrogation signal is preceded by a predetermined key signal,
said data storage means having a clock input for clocking data into said data storage means,
said reset output being connected to said clock input, and
wherein said data storage means has a data content for comparison with a key value corresponding to said key signal, whereby said key value upon the occurrence of matching, actuates a latch,
said latch when actuated supplying an enabling signal to permit a response to be given by said device to a following interrogation signal,
said device further comprising delay means connected to said reset output,
said delay means providing a delayed reset signal, said delayed reset signal being connected to a reset input of said latch and to a first input of an OR logic gate,
a further logic signal from said divider chain being connected to a second input of said OR logic gate, and
said OR logic gate having an output connected to a reset input of said second data storage means.

13. A codable electronic device comprising:
input circuitry,
a main memory and data storage means,
said device being arranged to receive an interrogation signal and to emit in response thereto a signal relating to the content of the main memory,
said input circuitry being arranged to receive pulses of a carrier signal, and
said device comprising divider or counter circuit means connected to receive the carrier signal from said input circuitry and having an output line supplying to said data storage means a data signal having alternating logic values in response to said carrier signal pules, wherein the logic value of said data signal alternates in time in dependence upon the length of a respective incoming carrier signal pulse received by said input circuitry,
said input circuitry having a reset output, wherein said data storage means comprises means for determining whether or not a response is given to an interrogation signal in dependence upon whether or not the interrogation signal is preceded by a predetermined key signal, said key signal comprising a carrier signal pulse having a length lying between predetermined limit values, said data storage means comprising first and second flip-flops, said first flip-flop having clock, data and reset inputs and a respective output and said second flip-flop having clock and set inputs and a respective output, wherein said reset output is connected to said clock input of said first flip-flop, to said set input of said second flip-flop and, via a diode, to said reset input of said first flip-flop, said logic signal is connected to said clock input of said second flip-flop is connected to said data input of said first flip flop, said output of said second flip-flop, whereby upon termination of a said carrier signal pulse the output of said second flip-flop, and hence said output of said first flip-flop as clocked out by said reset output of said clock input of said first flip-flop, depend upon the logic value of said logic signal, said output of said first flip-flop, upon arrival of a carrier signal pulse having a length lying between said predetermined limit values, supplying an enabling signal to permit a response to be given by said device to a following interrogation signal.

14. A method of imparting data to a data input of a data storage means of a codable electronic device, the codable electronic device comprising input circuitry having an output connected to a divider or counter circuit means, said divider or counter circuit means having an output line connected to said data input of said data storage means, the method comprising the steps of: supplying pulses of a carrier signal to said input circuitry, each of said pulses having a controlled length, dividing said carrier pulses in said divider or counter circuit means whereby to produce a data signal having alternating logic values, the logic value of said data signal alternating in time in dependence upon the length of a respective incoming carrier signal pulse received by said input circuitry and using the termination of each said carrier signal pulse to cause the respective logic value to be supplied to said data storage means, wherein the codable electronic device further comprises a reset circuit having a reset output, said reset output producing a reset signal upon termination of a said carrier signal pulse, and the method comprises using said reset signal to cause the respective logic value to be supplied to said data storage.

* * * * *